May 10, 1938. E. R. STANFORD ET AL 2,116,852
COMBINATION FORESTRY IMPLEMENT
Filed Nov. 20, 1934
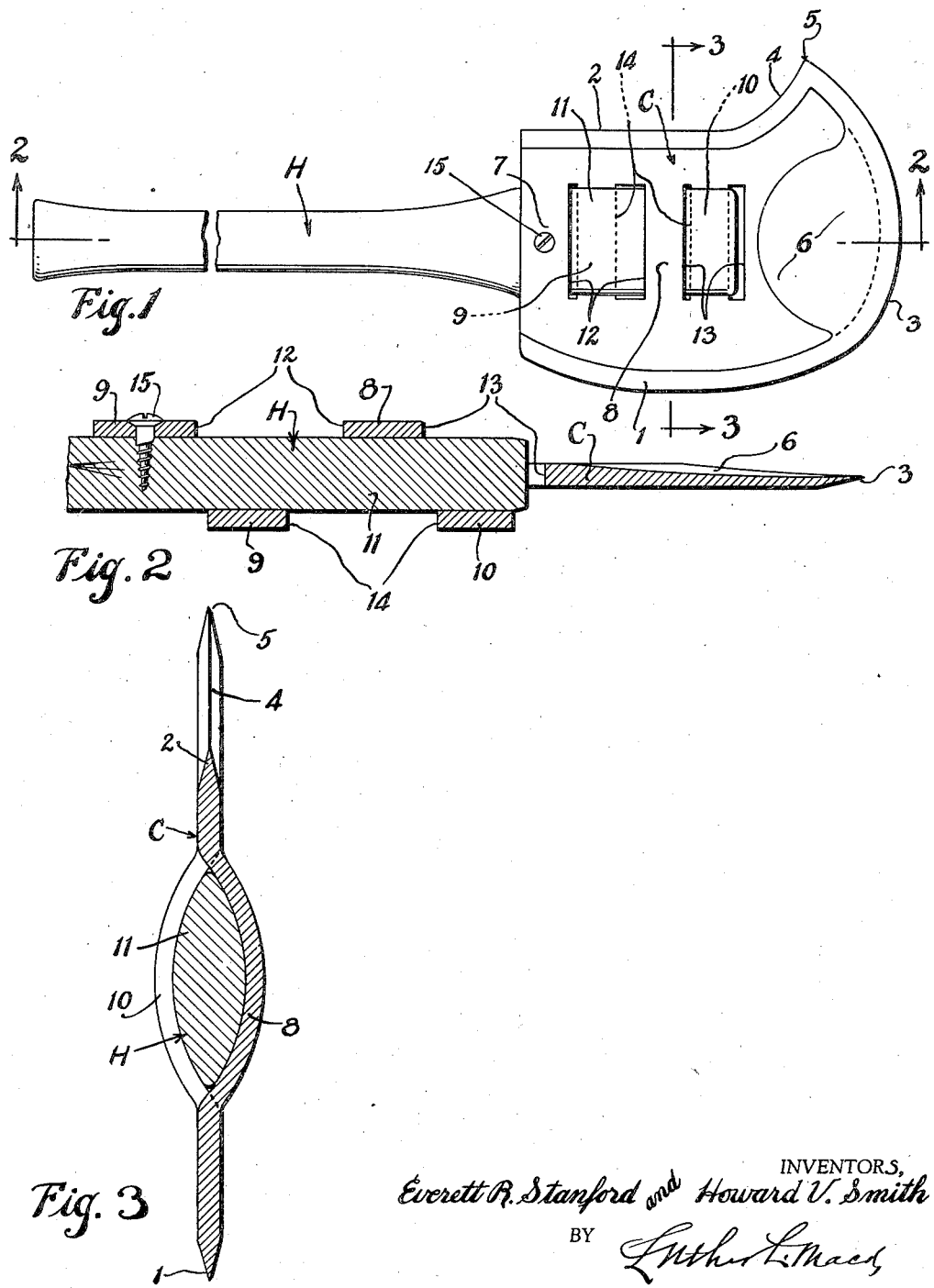
INVENTORS,
Everett R. Stanford and Howard V. Smith
BY
ATTORNEY.

Patented May 10, 1938

2,116,852

UNITED STATES PATENT OFFICE 2,116,852

COMBINATION FORESTRY IMPLEMENT

Everett R. Stanford, Alhambra, and Howard V. Smith, San Diego County, Calif.

Application November 20, 1934, Serial No. 753,912

2 Claims. (Cl. 7—14.1)

This invention relates to and has for a primary object the provision of a simple, economical and effective forestry implement which combines the functions of a broadaxe, a brush hook and a shovel in a single integral device and is particularly adapted for use in blazing trails through brush and wooded country, prevention and fighting forest fires and other purposes. Such an implement is particularly useful as an emergency device in fire fighting inasmuch as its weight is practically the equivalent of an axe or spade, and the use of other implements is rendered unnecessary by its use.

Our invention comprehends the provision of an implement for the purpose mentioned which embodies an integral cutting head, combining the characteristics of an axe, a brush hook and a shovel, and a standard double edged axe handle detachably secured to the head. In a preferred form our implement includes a head having a relatively broad body with substantially parallel cutting edges which, at the end of the body, have continuing arcuate cutting edges curved in the same direction to a point of meeting substantially outwardly of one of said parallel edges, thereby providing a hooked cutting edge at one side of the body.

One of the lateral cutting edges is useful instead of an axe, while the opposite lateral edge is useful as a brush hook, or cutting tool, and the end cutting edge adapts the implement to use as a shovel for digging or shovelling dirt, as when clearings are made but is not sharpened as are the lateral edges. A side of the body may be dished out to provide a shovel-like body by means of which the dirt may be thrown as when a shovel is used. Other objects of our invention will appear as the description progresses.

We have shown a preferred form of implement in the accompanying drawing, subject to modification, within the scope of the appended claims, without departing from the spirit of our invention.

In said drawing:

Fig. 1 is a side elevation of our improved implement;

Fig. 2 is a sectional elevation of the same on line 2—2 of Fig. 1; and

Fig. 3 is a transverse section on line 3—3 of Fig. 1.

Our implement consists of but two parts, i. e. a cutting head C and a handle H detachably secured thereto. The cutting head is formed preferably of forged metal with a pair of laterally spaced and substantially parallel cutting edges 1 and 2 disposed on opposite sides of the handle H, an arcuately formed end cutting edge 3 forming a continuation of the edge 1, and an arcuately formed shorter cutting edge 4 continuing from the edge 2, as shown in Fig. 1. The edges 3 and 4 are formed on different radii, are eccentric relative to each other, and join at a point 5 which is substantially outwardly of the edge 2, as shown in Fig. 1. Thus the edge 1 may be used as an axe, the edge 3 as a spade or shovel and the edges 2 and 4 as a brush cutter.

Above the portion 6 the tool is provided with a suitable handle socket formed by a pair of bars 7 and 8 on one side of the body and a similar pair of bars 9 and 10 on the other side of the body. Bars 7 and 8 are correspondingly bent outwardly in one direction while the bars 9 and 10 are similarly bent outwardly in an opposite direction, as shown in Fig. 3, thereby providing a socket of oval cross section for receiving and holding the lower end 11 of handle H. In the formation of the cutter head the forging dies are arranged for bending and forming the bars 7, 8, 9 and 10, and openings 12 and 13 alternate with the bars 7 and 8 on one side while a single opening 14 is formed between the bars 9 and 10 on the other side. Said bars are preferably staggered, as shown, but may be arranged in any other suitable manner for rigidly holding the handle H on the head C.

One or more of the bars may be secured to the portion 11, of the handle H, as by means of a screw or pin 15 in order to prevent the accidental detachment of the handle from the head.

In operation, when the implement is used as an axe the handle H is held after the fashion of an axe for cutting or chopping so as to render the cutting edge 1 effective. When used as a brush hook or cutter, the head C is held uppermost so that the hooked edge 4 and the continuing edge 2 may be used for cutting brush, limbs from trees, as in trail blazing and clearing operations. When used as a shovel, the edge 3 is adapted for digging or scraping the ground free of brush and vegetation, while the portion 6 is useful for lifting and throwing dirt.

It must be understood that in forestry work which is largely done in remote and ordinarily inaccessible places, implements must be carried on the person of the workers or by pack trains and, particularly in forest fire fighting, work is frequently hampered by lack of proper implements or the necessity for changing implements for different kinds of work. Hence, an implement such as we have shown and described herein is highly effective for the different kinds of labor required for fighting and may be used instead of three separate implements which are usually required for such work. Frequently the lack of a sufficient number and assortment of the different tools required delays the fire fighting activities to such an extent that a fire will get out of control before adequate fire fighting tools can be made available for the workers.

Thus, our improved implement which combines the functions and characteristics of three separate tools used in forestry work, substantially lightens the burden of fire fighting, prevents the delays incidental to securing and changing from one to another type of implement and enables each worker to be equipped with a single implement useful for all purposes of fire fighting.

What we claim is:

1. A forestry implement comprising a cutting head, and a handle secured thereto, said cutting head having lateral cutting edges on opposite sides of said handle, said lateral cutting edges being continued in a common direction and joined at a point outwardly of one of the lateral edges to form an intermediate cutting edge, said head having a concavity intermediate said lateral edges and adjacent said intermediate edge portion, for adapting the implement for use as a shovel.

2. A forestry implement comprising a cutting head, and a handle secured thereto, said cutting head having lateral cutting edges on opposite sides of said handle and provided at one end with straight edge portions which extend laterally from opposite sides of said handle to serve as a foot rest, said lateral cutting edges being continued in a common direction and joined at a point outwardly of one of the lateral edges to form an intermediate cutting edge, said head having a concavity intermediate said lateral edges and adjacent said intermediate edge portion, for adapting the implement for use as a shovel.

EVERETT R. STANFORD.
HOWARD V. SMITH.